United States Patent
Chen et al.

(10) Patent No.: US 10,943,358 B2
(45) Date of Patent: Mar. 9, 2021

(54) OBJECT TRACKING SYSTEM AND OBJECT TRACKING METHOD

(71) Applicant: HTC Corporation, Taoyuan (TW)

(72) Inventors: Yuan-Tung Chen, Taoyuan (TW);
Chih-Chien Chen, Taoyuan (TW);
I-Cheng Shih, Taoyuan (TW);
Su-Kang Chou, Taoyuan (TW);
Jyun-Jhong Lin, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 0 days.

(21) Appl. No.: 16/726,484

(22) Filed: Dec. 24, 2019

(65) Prior Publication Data

US 2020/0211207 A1 Jul. 2, 2020

Related U.S. Application Data

(60) Provisional application No. 62/784,837, filed on Dec. 26, 2018.

(51) Int. Cl.
*G06T 7/292* (2017.01)
*G06T 7/70* (2017.01)
*H04N 5/247* (2006.01)
*H04N 13/332* (2018.01)

(52) U.S. Cl.
CPC .............. *G06T 7/292* (2017.01); *G06T 7/70* (2017.01); *H04N 5/247* (2013.01)

(58) Field of Classification Search
CPC ........... G06T 7/292; G06T 7/70; H04N 5/247; H04N 13/332

USPC ........................................................ 348/158
See application file for complete search history.

(56) References Cited

U.S. PATENT DOCUMENTS

| | | | |
|---|---|---|---|
| 2016/0063762 A1* | 3/2016 | Heuvel | G06K 9/52 345/633 |
| 2018/0180733 A1* | 6/2018 | Smits | G01S 7/4863 |
| 2018/0292896 A1 | 10/2018 | Hicks et al. | |
| 2018/0343442 A1* | 11/2018 | Yoshikawa | H04N 21/2143 |

(Continued)

FOREIGN PATENT DOCUMENTS

| CN | 105992986 A | 10/2016 |
|---|---|---|
| TW | 201303639 A1 | 1/2013 |
| TW | 201800803 A | 1/2018 |

*Primary Examiner* — Jeffery A Williams
(74) *Attorney, Agent, or Firm* — Birch, Stewart, Kolasch & Birch, LLP

(57) ABSTRACT

An object tracking method includes following steps: transmitting search information for searching for an object by a first processor during a search stage; receiving the search information and using a second processor to determine whether any of at least one accessory camera has captured an object image in the search stage. When the second processor determines that at least one of the at least one accessory camera has captured the object image, the second processor transmits notification information to the first processor and the first processor enters a tracking stage and transmits request information to the second processor. When the second processor receives the request information, the second processor performs one of the following: transmitting the object image to the first processor, wherein the first processor calculates an object pose according to the object image.

12 Claims, 8 Drawing Sheets

(56) References Cited

U.S. PATENT DOCUMENTS

2019/0005546 A1* 1/2019 Chen .................. G06Q 30/0267
2019/0387168 A1* 12/2019 Smith .................. G06F 1/3265

* cited by examiner

OBJECT TRACKING SYSTEM AND OBJECT TRACKING METHOD

CROSS REFERENCE TO RELATED APPLICATIONS

This application claims the benefit of U.S. Provisional Application No. 62/784,837 filed Dec. 26, 2018, the entirety of which is/are incorporated by reference herein.

BACKGROUND OF THE INVENTION

Field of the Invention

The present disclosure relates to a tracking system and, in particular, to an object tracking system and an object tracking method.

Description of the Related Art

Existing camera-based head-mounted displays (HMD) have a fixed number of cameras. For example, there may be two cameras located in the front middle, one camera located on the right side, and another one located on the left side of the camera-based head-mounted display. The fixed number of cameras can capture images within a specific range of view, such as a horizontal field of view.

However, a fixed number of cameras can only offer a limited field of view, such as a vertical field of view. This may restrict the controller tracking region, so that areas above and below the camera-based head-mounted display cannot be captured.

Therefore, how to add at least one camera module to an existing module, such as camera-based head-mounted display, to extend the field of view of the camera-based head-mounted display, has become one of the problems to be solved in the field.

BRIEF SUMMARY OF THE INVENTION

In accordance with one feature of the present invention, the present disclosure provides an object tracking system. The object tracking system includes a head-mounted display (HMD) device and an accessory device. The HMD device includes a first processor. The first processor is configured to transmit search information for searching for an object during a search stage. The accessory device is connected to the HMD device. The accessory device includes at least one accessory camera and a second processor. The second processor is connected to the at least one accessory camera. The second processor is configured to receive the search information and determine whether any of the at least one accessory camera has captured an object image during the search stage. When the second processor determines that at least one of the at least one accessory camera has captured the object image, the second processor transmits notification information to the first processor and the first processor enters a tracking stage and transmits request information to the second processor. When the second processor receives the request information, the second processor performs one of the following: transmitting the object image to the first processor, wherein the first processor calculates an object pose according to the object image: and calculating the object pose according to the object image and transmitting the object pose to the first processor.

In accordance with one feature of the present invention, the present disclosure provides an object tracking method. The object tracking method includes following steps: transmitting search information for searching for an object by a first processor during a search stage; receiving the search information and using a second processor to determine whether any of at least one accessory camera has captured an object image in the search stage. When the second processor determines that at least one of the at least one accessory camera has captured the object image, the second processor transmits notification information to the first processor and the first processor enters a tracking stage and transmits request information to the second processor. When the second processor receives the request information, the second processor performs one of the following: transmitting the object image to the first processor, wherein the first processor calculates an object pose according to the object image; and calculating the object pose according to the object image and transmitting the object pose to the first processor.

The embodiments of the present invention provide an object tracking system and an object tracking method, which are provided with modularized accessory cameras of an accessory device. The accessory cameras are pluggable according to different need. An additional processor in the accessory device could help the head-mounted display device to search and track the controller. Thus, the object tracking system and the object tracking method achieve the effect of providing better distributed computing performance. Moreover, the object tracking system and the object tracking method can flexibly add at least one camera module (i.e., accessory camera) to an existing module (i.e., head-mounted display device), so as to extend the field of view of the head-mounted display device. Also, the object tracking region (e.g., controller tracking region) can be extended.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "comprises" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
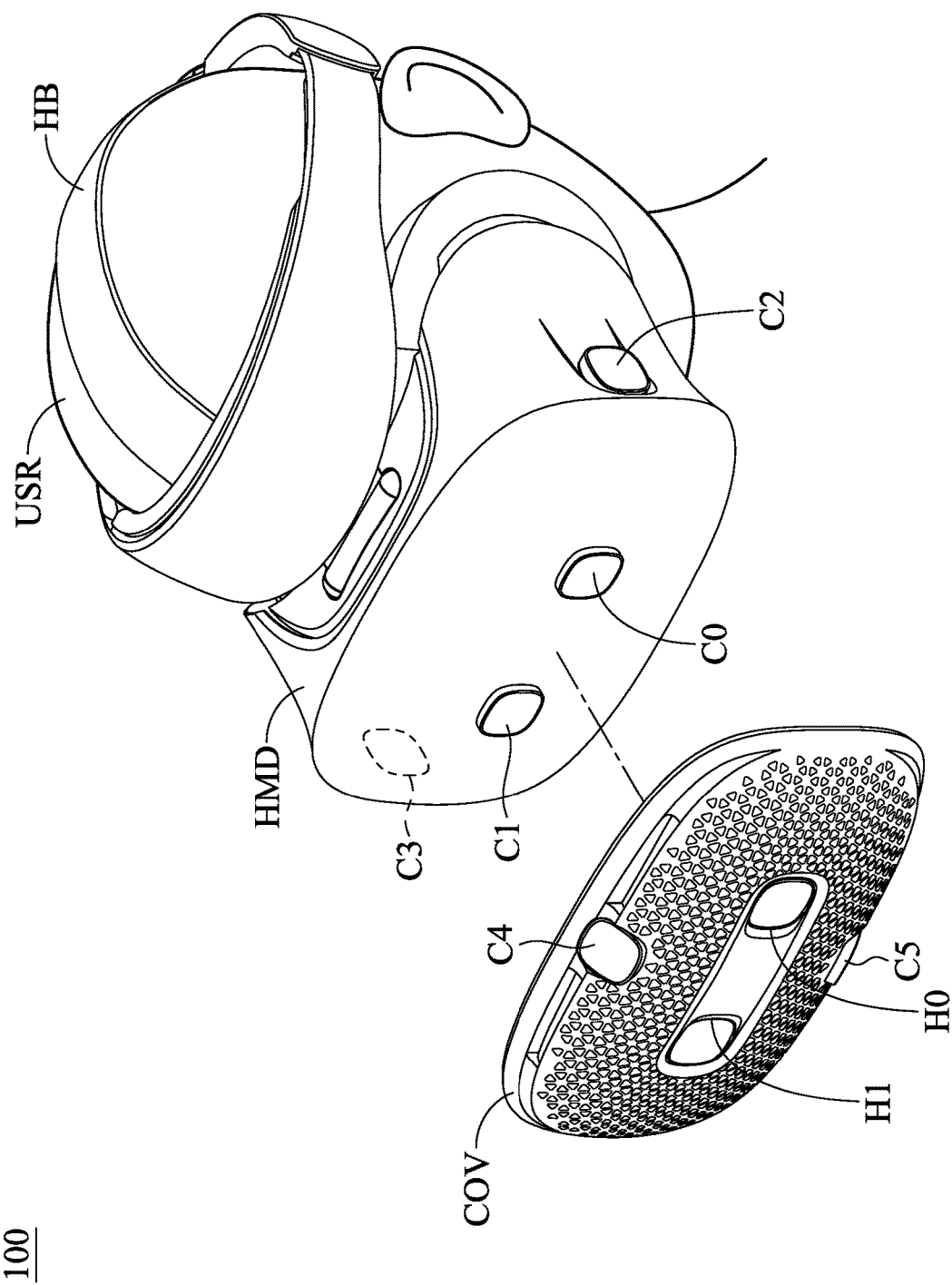
FIGS. 1-2 are schematic diagrams of an object tracking system in accordance with one embodiment of the present disclosure.
Figure 2:
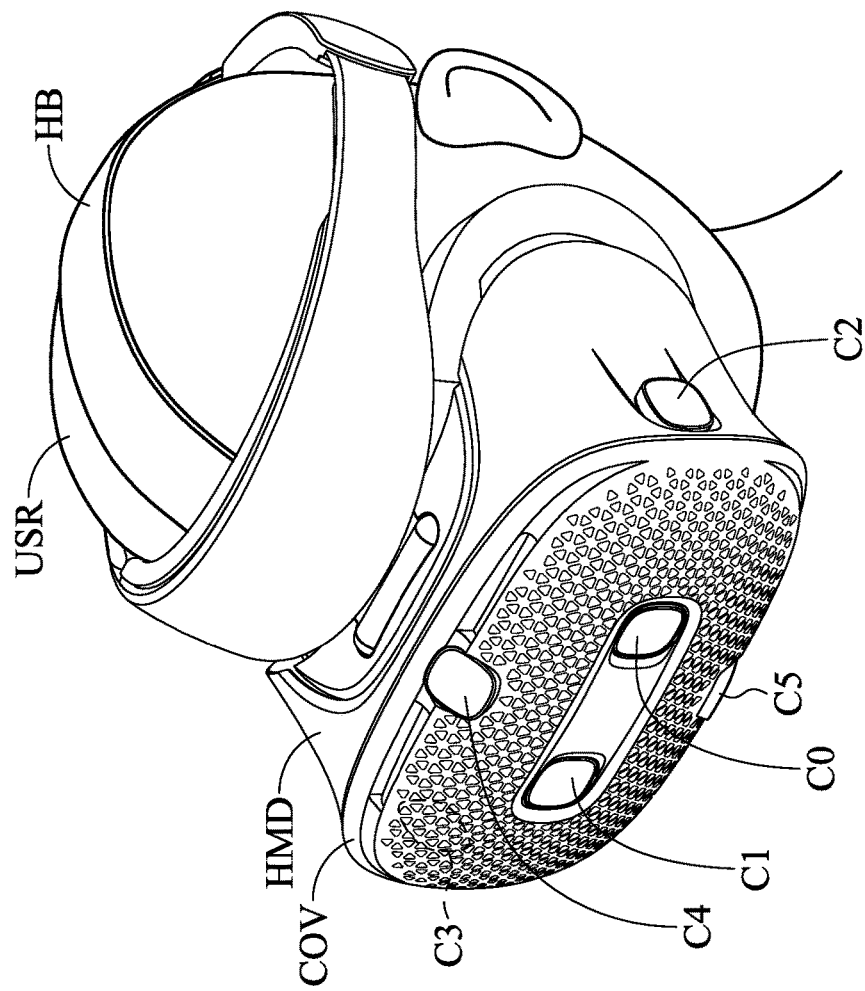
Figure 3:
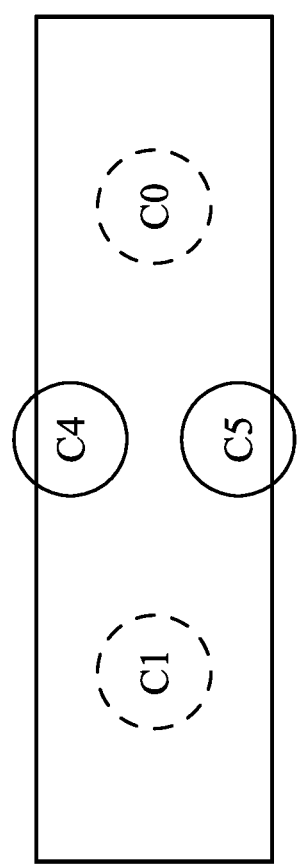
FIG. 3 is a schematic of a front view of an accessory device mounted on the object tracking system in accordance with one embodiment of the present disclosure.
Figure 4A:
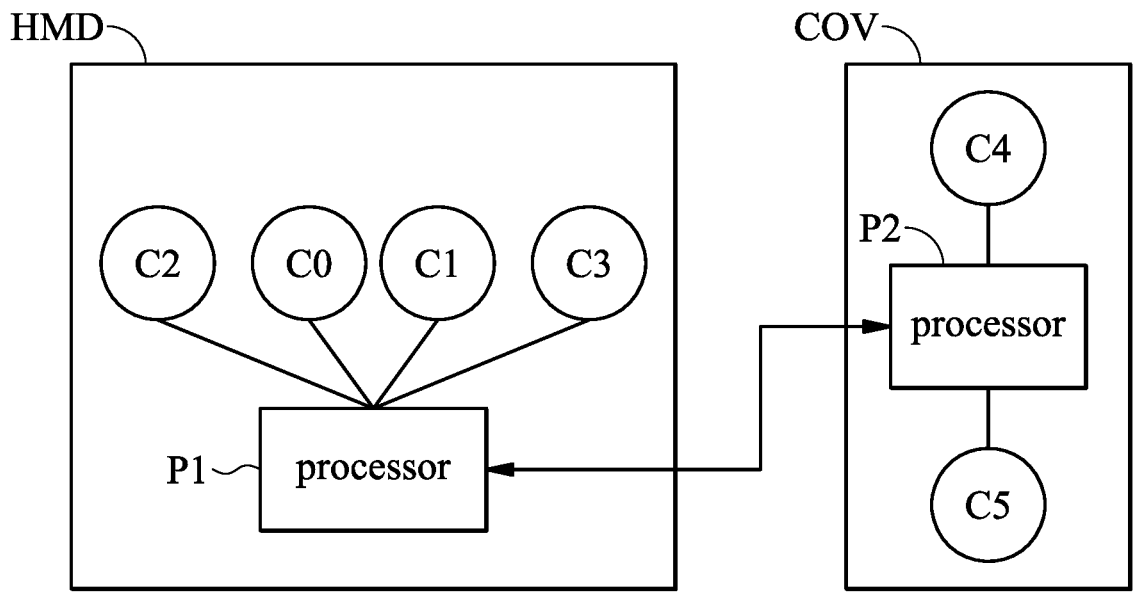
FIG. 4A is a block diagram of the object tracking system in accordance with one embodiment of the present disclosure.
Figure 4B:
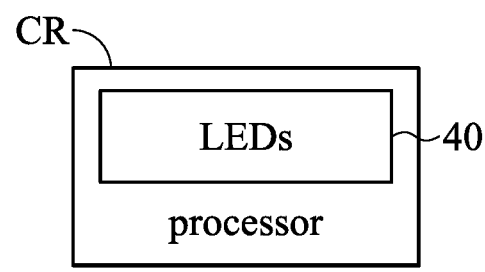
FIG. 4B is a block diagram of a controller in accordance with one embodiment of the present disclosure.

Please refer to FIGS. 1-4A and 4B, FIGS. 1-2 are schematic diagrams of an object tracking system 100 in accordance with one embodiment of the present disclosure. FIG. 3 is a schematic of a front view of an accessory device mounted on the object tracking system 100 in accordance with one embodiment of the present disclosure. FIG. 4A is a block diagram of the object tracking system 100 in accordance with one embodiment of the present disclosure. FIG. 4B is a block diagram of a controller CR in accordance with one embodiment of the present disclosure.

In one embodiment, a user USR wears the head-mounted display device HMD to experience virtual reality. In one embodiment, the head-mounted display device HMD can be can be fixed to the user's head via headband HB or helmet.

In one embodiment, the object tracking system 100 includes a head-mounted display device HMD and an accessory device COV. The accessory device COV is connected to the head-mounted display device HMD. In one embodiment, the accessory device COV can be any wearable device, such as smart watch, camera module, smart bracelet, sensor module, cover device, etc. The accessory device COV includes at least one accessory camera and a processor.

In one embodiment, the accessory device COV is a front cover device (as shown in FIG. 1) for the head-mounted display device HMD, the main cameras C0-C3 includes a left side camera C2, a right side camera C3, a left-front camera C0, and a right-front camera C1. The at least one accessory camera C4-C5 includes one camera placed on the top of the front cover device and another one placed on the bottom of the front cover device.

Refer to FIGS. 1 and 4A, in one embodiment, the head-mounted display device HMD includes a processor P1 and at least one main camera C0-C3. Each main camera C0-C3 connects to the processor P1 (as shown in FIG. 4A). In one embodiment, the main cameras C0-C3 are a left side camera C2, a right side camera C3, a left-front camera C0, and a right-front camera C1 on the head-mounted display device HMD. For convenience of explanation the example presented in the following embodiments use four main cameras C0-C3. However, those of ordinary skill in the art will understand that the present invention is not limited to initially configuring four cameras in the head-mounted display device HMD.

In one embodiment, the accessory device COV includes a processor P2 and at least one accessory camera C4-C5 (i.e., the accessory camera). Each accessory camera C4-C5 connects to the processor P2 (as shown in FIG. 4A). In one embodiment, the accessory device COV can be a cover with embedded accessory cameras C4-C5 connected to the processor P2. In one embodiment, one of the accessory cameras (e.g., accessory camera C4) is placed on the top of the accessory device COV, and another accessory camera (e.g., accessory camera C5) is placed on the bottom of the accessory device COV. For convenience of explanation, the examples used in the following embodiments have two accessory cameras C4-C5. However, those of ordinary skill in the art will understand that the present invention is not limited to configure two accessory cameras in the accessory device COV.

In one embodiment, the accessory cameras C4-C5 can be camera modules assembled/embedded into the accessory device COV.

In one embodiment, the accessory device COV includes holes H1 and H0. The position of the hole H1 corresponds to the position of the main camera C1. The position of the hole H0 corresponds to the position of the main camera C0.

In one embodiment, the processor P1 and/or the processor P2 can be any electronic device having a calculation function. The processor P1 and/or the processor P2 can be implemented using an integrated circuit, such as a micro-controller, a microprocessor, a digital signal processor, an application specific integrated circuit (ASIC), or a logic circuit.

In one embodiment, the main cameras C0-C3 and accessory cameras C4-C5 can be implemented by a camera module that includes a charge coupled device (CCD) or a complementary metal-oxide semiconductor (CMOS).

In one embodiment, the accessory device COV connects to the head-mounted display device HMD by wire or a wireless connection. For example, the accessory device COV can be plugged-in to the head-mounted display device HMD by applying the serial peripheral interface (SP1). As such, information can be exchanged between processors P1 and P2 the accessory device COV connects to the head-mounted display device HMD (as shown in FIG. 2).

In one embodiment, as shown in FIG. 3, when the accessory device COV is connected to the head-mounted display device HDM, the accessory camera C4 is located higher than the left-front camera C0 and the right-front camera C1, and the accessory camera C4 is located lower than the left-front camera C0 and the right-front camera C1.

In one embodiment, the accessory cameras C4-C5 are selectively placed in different places for expanding a field of view (FOV) of the head-mounted display device HMD. The processor P1 can obtain an object image (e.g., a controller image) from an accessory camera (e.g., accessory camera C5) or a main camera (e.g., main camera C0).

In other words, the accessory device COV can be regard as a cover device with top and bottom accessory cameras C4-C5. As shown in FIG. 2, the accessory device COV can be plugged-in to the head-mounted display device HMD. By the plug-in accessory cameras C4-C5 aid, the vertical field of view can be expended (e.g., up to 220 degrees). Therefore, the object tracking region can be extended by adding the accessory cameras C4-C5. For convenience of explanation, the following embodiments use the controller CR as an example of the object. However, those of ordinary skill in the art should understand that the present invention is not limited to track the controller CR.

In one embodiment, as shown in 4B, the controller CR includes light-emitting diodes (LEDs) 40. The processor P1 or the processor P2 calculates the object pose (e.g., the controller pose) according to the relative position of the LEDs 40 in the object image (e.g. the controller image). In one embodiment, these cameras C0-C5 can capture these LEDs 40 frame by frame.

In one embodiment, the object image is an image of the object. And, the object image can only include the partial image with identifiable feature of the object. The identifiable feature, for example, can be a light ball, the LEDs 40 or other specific pattern.

In one embodiment, the LEDs 40 are arranged in a pattern (see FIG. 7), and the processor P1 or P2 can determine the distance between the head-mounted display device HMD and the controller CR by the distance of each line segment of the pattern.

In one embodiment, the LEDs 40 are arranged in a pattern, and the processor P1 or P2 can determine the controller pose according to the rotation angle of the pattern. The processor P1 or P2 can apply known algorithm to calculate the object pose (e.g., the controller pose).

In one embodiment, the object pose is the pose of the object. The object pose include the information related to the rotation and the coordinate of the object. For example, the processor P1 or P2 can define the rotation and the absolute coordinate of X, Y, and Z axes of the controller CR in three-dimensional real space according to the pattern in the controller image (such as the position of the line segment in the pattern) and the position of the head-mounted display device HMD. Then, the processor P1 or P2 can track the movement of the controller CR on the absolute coordinate of X-axis, Y-axis and Z-axis and the rotation of the controller CR, thereby calculating the relative coordinate between the controller CR and the head-mounted display device HMD in the virtual reality. However, those of ordinary skill in the art should understand that the present invention is not limited to track the controller CR with the LEDs 40 and is not limited to use the method above. In addition, the processor P1 or P2 can use different known tracking algorithms for tracking different objects.

Figure 5:
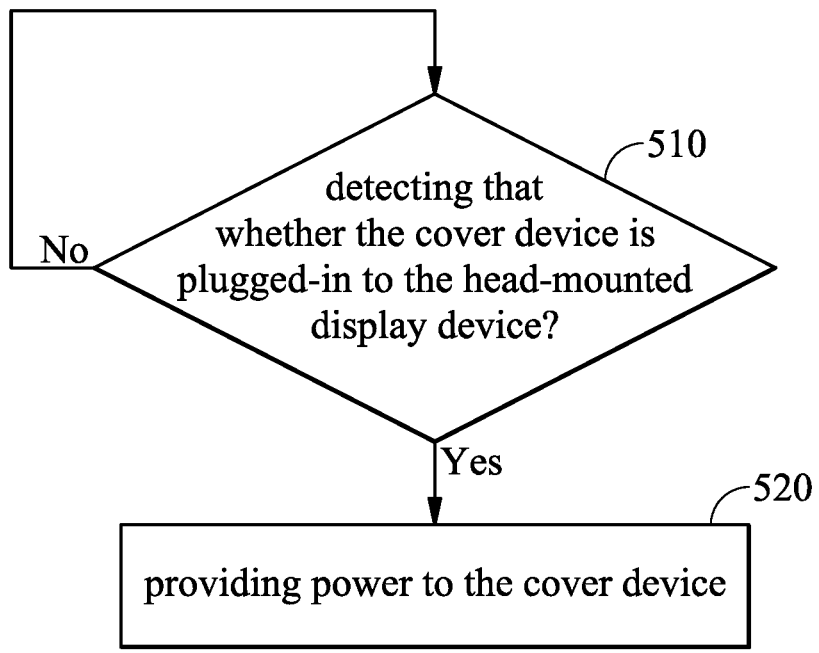
FIG. 5 is a flowchart of a method for powering-on the accessory device in accordance with one embodiment of the present disclosure.
Figure 6:
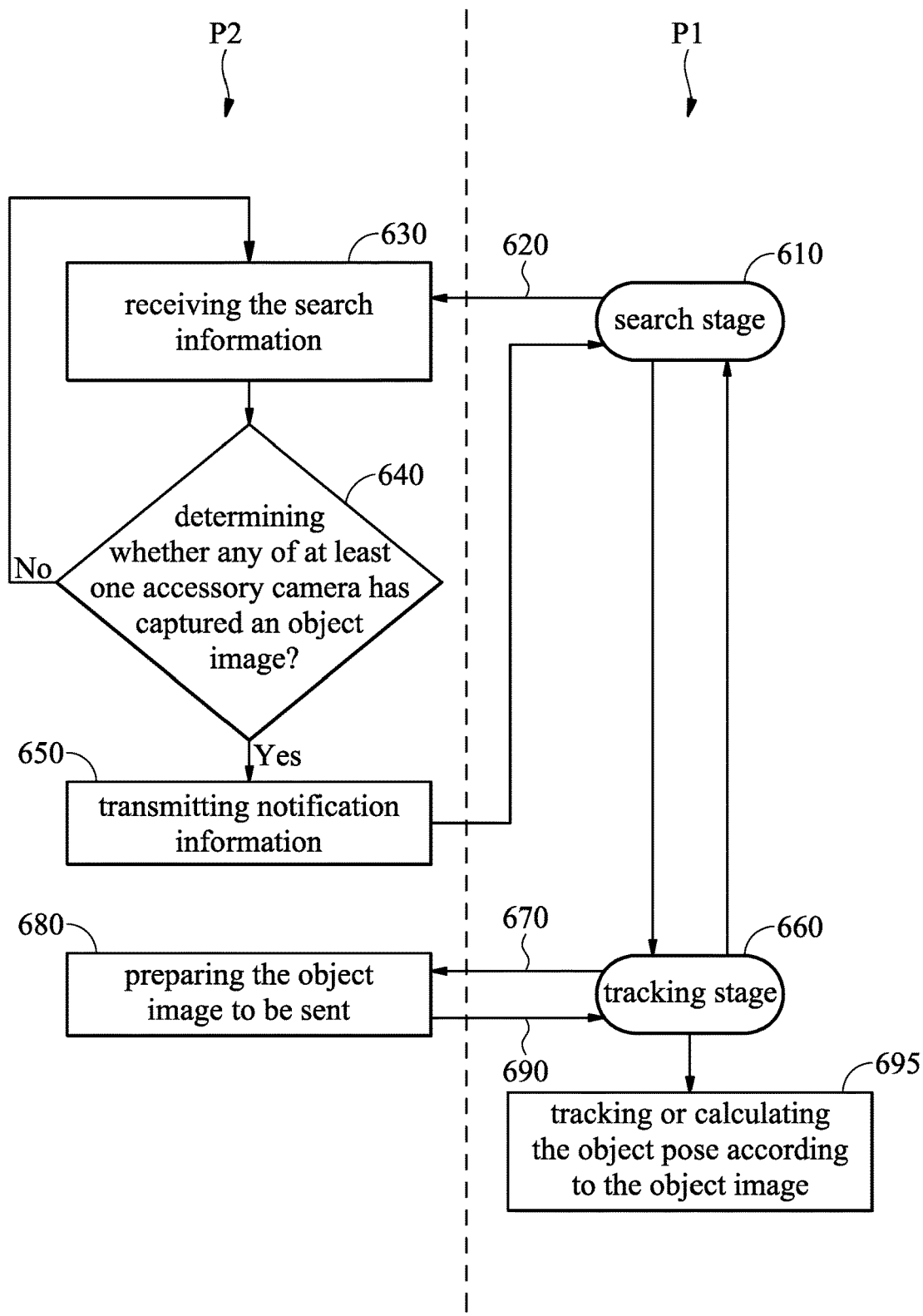
FIG. 6 is a flowchart of an object tracking method in accordance with one embodiment of the present disclosure.
Figure 7:
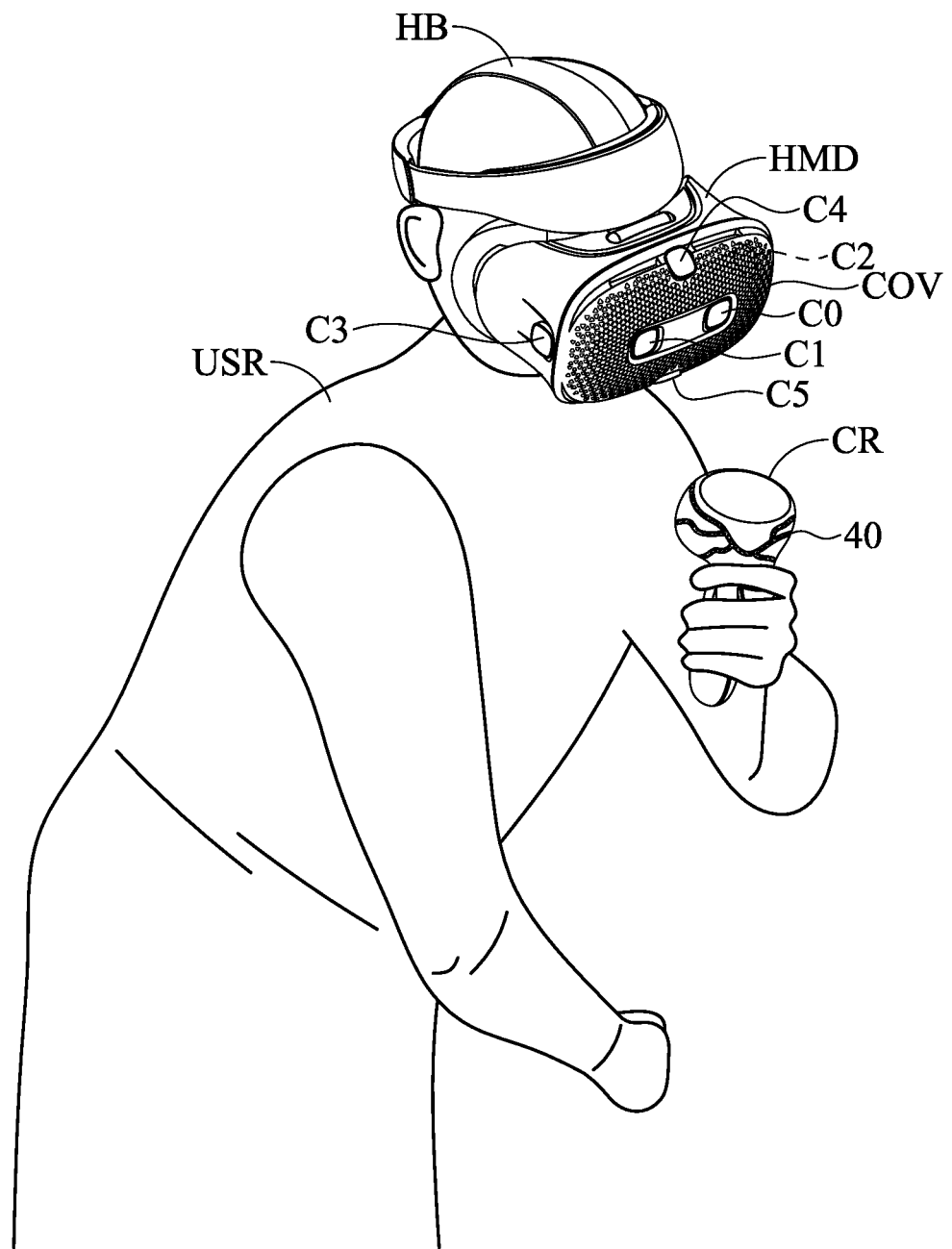
FIG. 7 is a scheme diagram of tracking object in accordance with one embodiment of the present disclosure.
Figure 8:
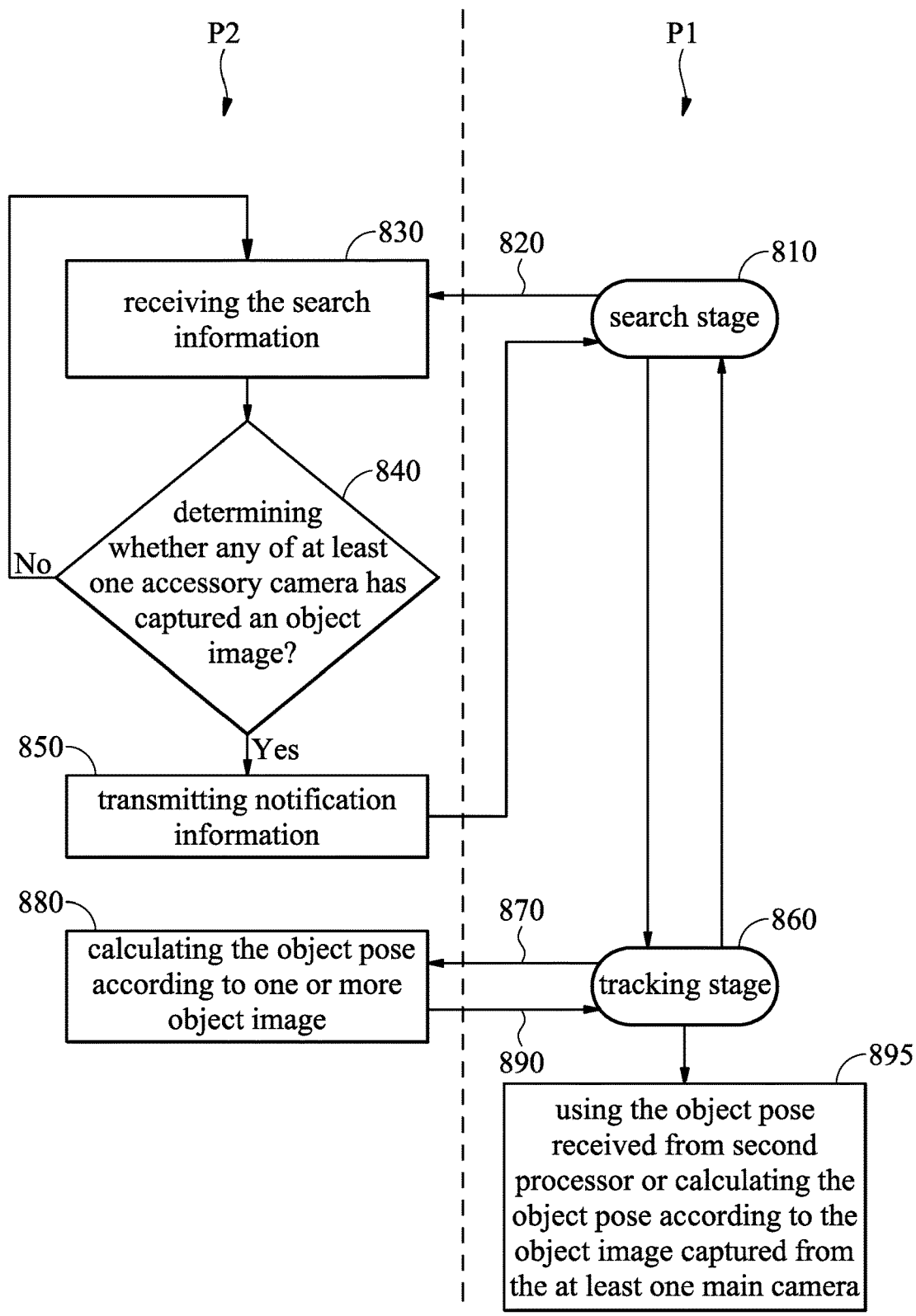
FIG. 8 is a flowchart of an object tracking method in accordance with one embodiment of the present disclosure.

Please refer to FIGS. 5-7. FIG. 5 is a flowchart of a method 500 for powering-on the accessory device in accordance with one embodiment of the present disclosure. FIG. 6 is a flowchart of an object tracking method 600 in accordance with one embodiment of the present disclosure. FIG. 7 is a scheme diagram of tracking object in accordance with one embodiment of the present disclosure. FIG. 8 is a flowchart of an object tracking method 800 in accordance with one embodiment of the present disclosure.

In one embodiment, the object tracking method 600 and/or object tracking method 800 can apply to track multiple objects. For the convenience of description, the following uses the controller CR as an example.

Refer to FIG. 5, in the step 510, the head-mounted display device HMD detects whether the accessory device COV is plugged-in to the head-mounted display device HMD. If head-mounted display device HMD detects that the accessory device COV is plugged-in to the head-mounted display device HMD, the step 520 is performed. If head-mounted display device HMD detects that the accessory device COV is not plugged-in to the head-mounted display device HMD, the step 510 is performed again. In step 520, the head-mounted display device HMD provides power to the accessory device COV. Therefore, the accessory device COV is powered-on in step 520. As such, the power supply for the accessory device COV is provided by the head-mounted display device HMD. Once the accessory device COV is plugged-in to the head-mounted display device HMD, the accessory device COV is in power-on state.

Refer to FIG. 6, the object tracking method 600 is performed by the processor P1 of the head-mounted display device HMD and the processor P2 of the accessory device COV.

In the step 610, the processor P1 enters the search stage for searching for an object image (e.g., the controller CR).

In one embodiment, the processor P1 determines whether any of the at least one main camera C0-C3 has captured an object image during the search stage.

In step 620, the processor P1 transmits search information for searching for the object during a search stage.

In step 630, the processor P2 receives the search information.

In one embodiment, the processor P2 receives the search information and performs a search algorithm. The search algorithm for searching for the object image can apply the known search algorithm, such as perceptual hash algorithm, feature matching algorithm . . . , etc.

In on embodiment, the processor P1 performs the search algorithm on the images captured by a main camera C0-C3 and the processor P2 performs the search algorithm on the images captured by an accessory camera C4-C5 to determine whether the object image was captured during the search stage.

In one embodiment, the object image can be an image including the controller image.

In one embodiment, the processor P1 checks all the images captured by the main cameras C0-C3 to find the object image.

In one embodiment, the processor P2 checks all the images captured by the accessory cameras C4-C5 to find the object image. For example, from the images captured by the accessory cameras C4-C5, the processor P2 compares which part of each image is like a controller CR to find the controller image.

In step 640, the processor P2 uses a second processor to determine whether any of at least one accessory camera C4-C5 has captured an object image.

In one embodiment, the processor P2 determines whether at least one accessory camera C4-C5 connected to the processor P2 has captured an object image during the search stage. If the processor P2 determines that at least one accessory camera C4-C5 connected to the processor P2 captured the object image during the search stage, step 650 is performed.

In step 650, the processor P2 transmits notification information to the processor P1.

In one embodiment, the notification information includes camera information. The camera information indicates that a specific accessory camera (e.g., accessory camera C5) has captured the object image. Since the processor P1 has obtained the camera information, step 660 is performed.

In step 660, the processor P1 enters the tracking stage.

In one embodiment, the processor P1 continuously tracks or calculates the object pose of the object image captured by the specific accessory camera (e.g., accessory camera C5) in the tracking stage. Therefore, the processor P1 needs to inform the accessory device COV to provide the object image.

In one embodiment, the processor P2 transmits handover information to the head-mounted display device HMD when the object is moving from the FOV of one of the camera C0-C5 (e.g., the FOV of accessory camera C4) to another one (e.g., the FOV of accessory camera C5). The handover information indicates that another specific accessory camera (e.g., accessory camera C4) has captured the object image, the processor P1 performs a handover process to continuously track or calculate the object pose of the object image captured by the other specific accessory camera (e.g., accessory camera C4) in the tracking stage. For example, as shown in FIG. 7, when the controller CR is moving up from the bottom of the head-mounted display device HMD (the arrow indicates that the controller CR is moving from bottom to top), and the controller image is initially captured by camera C5 and changing to be captured by camera C4, the processor P1 performs a handover process to continuously track or calculate the controller pose of the controller image captured by the accessory camera C4 in the tracking stage.

In step 670, the processor P1 transmits request information to the processor P2. In one embodiment, the processor P1 transmits request information to the processor P2 for asking the accessory device COV to provide the object image or more object image.

In step 680, when the processor P2 receives the request information, the processor P2 prepares the object image to be sent.

In one embodiment, the request information includes a crop command, when the processor P2 receives the request information, the processor P2 crops the object image to obtain a partial image of the object image (e.g., retrieve/crop the controller image part from the whole object image) which still contains the object and transmits the partial image (e.g., the controller image part) to the processor P1, and the processor P1 calculates the object pose according to the partial image. For example, the whole object image is 640*480 pixels. The processor P2 can crop the controller image part (e.g., 60*40 pixels) from the whole object image. By cropping the object part, it can reduce the transmission amount in step 690.

In one embodiment, the partial image can only include the partial identifiable feature of the object. For example, the partial image can only include a light ball, some of the LEDs 40 or partial specific pattern, without a whole controller CR image.

In other words, once finding the controller image, the search stage changes to tracking stage, the processor P1 of the head-mounted display device HMD will send crop command to processor P2 to ask providing the object images. Further the crop command means that the accessory device COV only send the object image region which has the controller image (i.e. controller's picture), not the whole object image. This technology can gain image data transmission immediately In step 690, the processor P2 transmits the object image to the processor P1.

In one embodiment, once an accessory camera (e.g., accessory camera C5) captures the object image, the processor P2 transmits the object image to a buffer (e.g., RAM) of the head-mounted display device HMD. The processor P1 can obtain the object image from the buffer.

In step 695, the processor P1 tracks or calculates the object pose according to the object image.

In one embodiment, after the processor P1 receives one or more object image(s), the processor P1 tracks or calculates the object pose according to the object image.

In one embodiment, if the processor P1 does not continuously obtain the object image, it enters the search stage (step 610) again. For example, when the processor P1 is lose tracking of the object, the processor P1 enters the search stage. Then, all the main cameras C0-C3 and/or all the accessory cameras C4-C5 search for the object image again.

In one embodiment, the search stage is used to use multiple or all cameras C0-C5 to find which camera the object image was captured by. Moreover, the search stage is used to find which part of the whole FOV the object image appears in.

For example, after the controller CR leaves the FOV firstly, and then the controller CR enters the FOV again, the processor P1 enters the search stage to find out which specific camera is taken the controller image.

In another example, in the search stage, if the processor P1 knows that the controller CR is moving out of the FOV from the underside, it is predicted that the controller CR will run back from the underside of the FOV. Therefore, the processor P1 increases the priority of searching weight of the accessory camera C5. However, the processor P1 will still search for all cameras C0-C5 for controller images.

In one embodiment, after the specific camera (e.g. accessory camera C5) captured the object image is found out in search stage, the tracking stage is used to precisely track the object pose from the specific camera (e.g. accessory camera C5). In the tracking stage, other cameras (e.g., cameras C0-C4) will capture images continually, but the images taken by it will not be stored in the buffer and will not be used for further calculations.

Therefore, by applying the concept of extending cameras, at least one accessory device COV can be mounted on or connected to the head-mounted display device HMD. The connection method of the accessory device COV and the head-mounted display device HMD is not limited thereto.

FIG. 8 is a flowchart of an object tracking method 800 in accordance with one embodiment of the present disclosure. The steps 610-660 are respectively the same as the steps 810-860. Therefore, the following describes steps 870-890.

The object image mentioned in both FIG. 6 and FIG. 8 is captured by the at least one accessory camera C4-C5. The difference is that the object pose is calculated by the processor P1 in FIG. 6, and the object pose is calculated by the processor P2 in FIG. 8. In step 870, the processor P1 transmits request information to the processor P2.

In one embodiment, the processor P1 transmits request information to the processor P2 for asking the accessory device COV to provide the object pose according to one or more object image.

For example, once finding the controller image, the search stage changes to tracking stage, the processor P1 of the head-mounted display device HMD will send track command to processor P2 to ask providing the controller pose.

In step 880, when the processor P2 receives the request information, the processor P2 calculates the object pose according to one or more object image.

When processor P2 has better computing ability, the processor P2 can calculate the object pose according to one or more object image.

In step 890, the processor P2 transmits the object pose to the processor P1.

In one embodiment, once an accessory camera (e.g., accessory camera C5) captures the object image, the processor P2 transmits the object pose to a buffer (e.g., RAM) of the head-mounted display device HMD. The processor P1 can obtain the object pose from the buffer.

For example, the processor P2 defines the rotation and the absolute coordinate of X, Y, and Z axes of the controller CR in three-dimensional real space according to the pattern in the controller image and the position of the head-mounted display device HMD.

In step 895, the processor P1 uses the object pose received from processor P2, or the processor P1 calculates the object pose according to the object image captured from the at least one main camera C0-C3.

For example, the processor P1 tracks the movement of the controller CR on the absolute coordinate of X-axis, Y-axis and Z-axis and the rotation of the controller CR, thereby calculating the relative coordinate between the controller CR and the head-mounted display device HMD in the virtual reality.

In one embodiment, if the at least one main camera C0-C3 captures the object image, the processor P1 calculates the object pose according to the object image captured from the at least one main camera C0-C3. If the at least one accessory camera C4-C5 captures the object image, the processor P1 or P2 calculates the object pose according to the object image captured from the at least one accessory camera C4-C5 (by the object tracking method 600 or 800).

In one embodiment, if both the at least one main camera C0-C3 and the at least one accessory camera C4-C5 captures the object images the processors P1 and P2 independently calculate the object pose according to the object images. And, the processor P2 transmits the object pose calculated by the processor P2 to the processor P1. Then, the processor P1 generates a fusion pose according to the object pose calculated by the processor P2 and the object pose calculated by the processor P1.

The embodiments of the present invention provide an object tracking system and an object tracking method which are provided with modularized accessory cameras of an accessory device. The accessory cameras are pluggable according to different need. An additional processor in the accessory device could help the head-mounted display device to search and track the controller. Thus, the object tracking system and the object tracking method achieve the effect of providing better distributed computing performance. Moreover, the object tracking system and the object tracking method can flexibly add at least one camera module (i.e., accessory camera) to an existing module (i.e., head-mounted display device), so as to extend the field of view of the head-mounted display device. Also, the object tracking region (e.g., controller tracking region) can be extended.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. An object tracking system, comprising:
a head-mounted display (HMD) device comprising:
a first processor, configured to transmit search information for searching for an object;
an accessory device, connected to the HMD device, comprising:
at least one accessory camera; and
a second processor, connected to the at least one accessory camera, configured to receive the search information from the first processor and determine whether any of the at least one accessory camera has captured an object image;
wherein, when the second processor determines that at least one of the at least one accessory camera has captured the object image, the second processor transmits notification information to the first processor and then the first processor transmits request information to the second processor;
when the second processor receives the request information from the first processor, the second processor performs one of the following:
transmitting the object image to the first processor, wherein the first processor calculates an object pose according to the object image; and
calculating the object pose according to the object image and transmitting the object pose to the first processor.

2. The object tracking system of claim 1, wherein the HMD device further comprises at least one main camera, and the first processor determines whether any of the at least one main camera has captured an object image.

3. The object tracking system of claim 1, wherein the notification information includes camera information, the camera information indicates that a specific accessory camera has captured the object image, and the first processor continuously tracks or calculates the object pose according to the object image captured by the specific accessory camera.

4. The object tracking system of claim 1, wherein the second processor transmits handover information to the HMD device, and the handover information indicates that another specific accessory camera captures the object image, and the first processor performs a handover process to continuously track or calculate the object pose according to the object image captured by the another accessory camera.

5. The object tracking system of claim 1, wherein the request information comprises a crop command, and when the second processor receives the request information, the second processor crops the object image to obtain a partial image of the object image which still contains the object and transmits the partial image to the first processor, and the first processor calculates the object pose according to the partial image.

6. The object tracking system of claim 2, wherein the accessory device is a front cover device for the HMD device, the at least one main cameras comprises a left side camera, a right side camera, a left-front camera, and a right-front camera, and the at least one accessory camera comprises one camera placed on the top of the front cover device and another one placed on the bottom of the front cover device.

7. An object tracking method for use in an object tracking system comprising a head-mounted display (HMD) device and an accessory device, wherein the HMD device comprises a first processor, and the accessory device comprises at least one accessory camera and a second processor, the object tracking method comprising:
transmitting search information for searching for an object by the first processor;
receiving the search information from the first processor and determining whether any of the at least one accessory camera has captured an object image by the second processor;
when the second processor determines that at least one of the at least one accessory camera has captured the object image, the second processor transmits notification information to the first processor and then the first processor transmits request information to the second processor; and
when the second processor receives the request information from the first processor, the second processor performs one of the following:

transmitting the object image to the first processor, wherein the first processor calculates an object pose according to the object image; and calculating the object pose according to the object image and transmitting the object pose to the first processor.

8. The object tracking method of claim 7, wherein the HMD device further comprises at least one main camera, and the first processor determines whether any of the at least one main camera has captured an object image.

9. The object tracking method of claim 7, wherein the notification information includes camera information, the camera information indicates that a specific accessory camera has captured the object image, and the first processor continuously tracks or calculates the object pose according to the object image captured by the specific accessory camera.

10. The object tracking method of claim 7, wherein the second processor transmits handover information to the HMD device, and the handover information indicates that another specific accessory camera captures the object image, and the first processor performs a handover process to continuously track or calculate the object pose according to the object image captured by the another accessory camera.

11. The object tracking method of claim 7, wherein the request information comprises a crop command, and when the second processor receives the request information, the second processor crops the object image to obtain a partial image of the object image which still contains the object and transmits the partial image to the first processor, and the first processor calculates the object pose according to the partial image.

12. The object tracking method of claim 8, wherein the accessory device is a front cover device for the HMD device, the at least one main cameras comprises a left side camera, a right side camera, a left-front camera, and a right-front camera, and the at least one accessory camera comprises one camera placed on the top of the front cover device and another one placed on the bottom of the front cover device.

* * * * *